(12) United States Patent
Jiang et al.

(10) Patent No.: US 11,751,213 B2
(45) Date of Patent: *Sep. 5, 2023

(54) RESOURCE ALLOCATION INDICATION METHOD, BASE STATION, AND TERMINAL

(71) Applicant: VIVO MOBILE COMMUNICATION CO., LTD., Chang'an Dongguan (CN)

(72) Inventors: Lei Jiang, Chang'an Dongguan (CN); Xiaodong Shen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 168 days.

This patent is subject to a terminal disclaimer.

(21) Appl. No.: 17/376,308

(22) Filed: Jul. 15, 2021

(65) Prior Publication Data

US 2021/0345311 A1 Nov. 4, 2021

Related U.S. Application Data

(63) Continuation of application No. 16/488,779, filed as application No. PCT/CN2018/074085 on Jan. 25, 2018, now Pat. No. 11,153,864.

(30) Foreign Application Priority Data

Feb. 27, 2017 (CN) .......................... 201710108436.6

(51) Int. Cl.
*H04W 72/04* (2023.01)
*H04W 76/27* (2018.01)
(Continued)

(52) U.S. Cl.
CPC ........... *H04W 72/23* (2023.01); *H04W 76/27* (2018.02); *H04W 72/0453* (2013.01)

(58) Field of Classification Search
CPC .. H04W 72/23; H04W 72/0453; H04W 76/27
See application file for complete search history.

(56) References Cited

U.S. PATENT DOCUMENTS

| 11,153,864 B2 | 10/2021 | Jiang et al. |
| 2011/0255485 A1 | 10/2011 | Chen et al. |

(Continued)

FOREIGN PATENT DOCUMENTS

| CN | 101272615 A | 9/2008 |
| CN | 102014444 A | 4/2011 |

(Continued)

OTHER PUBLICATIONS

1st Chinese Office Action for Chinese Application No. 201710108436. 6, dated May 15, 2019 (May 15, 2019)—6 pages English translation—7 pages).

(Continued)

*Primary Examiner* — Melvin C Marcelo
(74) *Attorney, Agent, or Firm* — Culhane Meadows PLLC; Stephen J. Weed

(57) ABSTRACT

A resource allocation indication method, a base station and a terminal are provided. The method includes allocating corresponding target transmission resources to a terminal when a target service occurs, where the target transmission resources include uplink or downlink transmission resources; transmitting resource indication information to the terminal according to the target transmission resources, where the resource indication information includes first and second indication information, the first indication information is used to indicate one or more bandwidth parts of the target transmission resources, the one or more bandwidth parts are a portion or all of a total bandwidth, the second indication information is used to indicate location information of Physical Resource Blocks (PRBs) allocated to the (Continued)

terminal in PRBs corresponding to the one or more bandwidth parts.

20 Claims, 8 Drawing Sheets

(51) Int. Cl.
*H04W 72/23* (2023.01)
*H04W 72/0453* (2023.01)

(56) References Cited

U.S. PATENT DOCUMENTS

| | | |
|---|---|---|
| 2012/0275428 A1 | 11/2012 | Feng et al. |
| 2012/0294250 A1 | 11/2012 | Pan et al. |
| 2016/0269162 A1 | 9/2016 | Zhao et al. |
| 2017/0135105 A1 | 5/2017 | Li et al. |
| 2017/0347268 A1 | 11/2017 | Chen et al. |
| 2021/0050970 A1 | 2/2021 | Chen et al. |
| 2021/0058947 A1 | 2/2021 | Lin et al. |

FOREIGN PATENT DOCUMENTS

| | | |
|---|---|---|
| CN | 102083226 A | 6/2011 |
| CN | 102196495 A | 9/2011 |
| CN | 102202407 A | 9/2011 |
| CN | 102577571 A | 7/2012 |
| CN | 103220796 A | 7/2013 |
| CN | 103298117 A | 9/2013 |
| CN | 103298118 A | 9/2013 |
| CN | 104378826 A | 2/2015 |
| CN | 105991270 A | 10/2016 |
| CN | 106413105 A | 2/2017 |
| CN | 106455103 A | 2/2017 |
| WO | 2015169037 A1 | 11/2015 |
| WO | 2016123213 A1 | 8/2016 |
| WO | 2016161630 A1 | 10/2016 |
| WO | 2016163922 A1 | 10/2016 |

OTHER PUBLICATIONS

1st Non-Final Office Action for U.S. Appl. No. 16/488,779 dated Mar. 18, 2021, 11 pages.

2nd Chinese Office Action for Chinese Application No. 201710108436.6, dated Aug. 12, 2019 (Aug. 12, 2019)—7 pages (English translation—8 pages).

Chinese Search Report for CN Application No. 201710108436.6 dated Apr. 15, 2019 (Apr. 15, 2019)—5 pages (English translation—3 pages).

CMCC: "Discussion on downlink control monitoring resources design for sTTI" R1-1703413, 3GPP TSG RAN WG1 Meeting #88, Athens, Greece, Feb. 17, 2017, 3 pages.

Ericsson: "Summary of e-mail discussions on downlink control signaling" R1-1701036, TSG-RAN WG1 Nr AdHoc, Spokane, WA, US, Jan. 16, 2017, 18 pages.

Extended European Search Report for European Application No. 18758241.6, dated Jan. 27, 2020 (Jan. 27, 2020)—11 pages.

International Search Report and Written Opinion for International Application No. PCT/CN2018/074085, dated Jan. 25, 2018 (Jan. 25, 2018)—9 pages (English translation—5 pages).

Motorola Mobility et al: "sTTI scheduling", R1-1703038, 3GPP TSG RAN WG1#88, Feb. 13, 2017, Athens, Greece, 5 pages.

RESOURCE ALLOCATION INDICATION METHOD, BASE STATION, AND TERMINAL

CROSS-REFERENCE TO RELATED APPLICATION

This application is continuation application of U.S. patent application Ser. No. 16/488,779 filed on Aug. 26, 2019 which is a U.S. national phase application of PCT Application No. PCT/CN2018/074085 filed on Jan. 25, 2018, which claims priority to Chinese Patent Application No. 201710108436.6 filed in China on Feb. 27, 2017, the disclosures of which are incorporated herein by reference in their entireties.

TECHNICAL FIELD

The present disclosure relates to the field of communication technology, and more particularly, relates to a resource allocation indication method, a base station and a terminal.

BACKGROUND

Compared with traditional mobile communication systems, future new radio (NR) mobile communication systems need to adapt to more diverse scenarios and service requirements. Main scenarios of the NR include an Enhance Mobile Broadband (eMBB), large-scale internet of things (such as Massive Machine Type Communication (mMTC), Ultra reliable & Low Latency Communication (URLLC). These scenarios require systems having high reliability, low latency, a large bandwidth and a wide coverage. In order to satisfy services having different requirements and different application scenarios, a NR system is no longer provided with a single subcarrier spacing of 15 kHz as that in a conventional LTE system, but may support multiple subcarrier spacings. Different subcarrier spacings may be suitable for different scenarios. For example, for a scenario having a high frequency-band and a large bandwidth, relatively wider subcarrier spacings may be configured. In such a case, a wider subcarrier spacing corresponds to a smaller symbol length in time domain, which may meet requirements of low-latency services.

In Fifth-Generation (5G) technical schemes, subcarrier spacings of a 5G system may be $2^n \times 15$ kHz. Meanwhile, these different subcarrier spacings may present on a same carrier, that is, different carrier numerologies may be multiplexed. Different services or different application scenarios are provided with corresponding numerologies. Different numerologies may be provided with different bandwidths according to requirements of the services, as shown in FIG. 1.

Further, the NR system supports broadband transmission, and a bandwidth of the NR system may be up to about 1 GHz. However, in consideration of capability of a User Equipment (UE), the UE may not support an entirety of the bandwidth of the NR system, but may support only a part or parts of the bandwidth and transmit or receive data or signaling on the frequency-domain resources. In consideration of flexibly utilizing frequency-domain resources, the system needs to additionally indicate to the UE a frequency domain bandwidth and locations of frequency domain resources being currently scheduled. Thus, how to indicate flexible allocation of frequency domain resources needs to be solved.

SUMMARY

Embodiments of the present disclosure provide a resource allocation indication method, a base station, and a terminal so as to solve a problem in the related art that allocation of frequency-domain resources in the related art cannot be indicated flexibly.

In a first aspect, some embodiments of the present disclosure provide a resource allocation indication method applied to a base station side. The resource allocation indication method includes allocating corresponding target transmission resources to a terminal in a case that a target service occurs, wherein the target transmission resources includes uplink transmission resources or downlink transmission resources; transmitting resource indication information to the terminal according to the target transmission resources, wherein the resource indication information includes first indication information and second indication information, the first indication information is used to indicate one or more bandwidth parts of the target transmission resources, the one or more bandwidth parts are a portion or all of a total bandwidth, the second indication information is used to indicate location information of Physical Resource Blocks (PRBs) allocated to the terminal in PRBs corresponding to the one or more bandwidth parts.

In a second aspect, some embodiments of the present disclosure provide a resource allocation indication method applied to a terminal side. The resource allocation indication method includes receiving resource indication information transmitted by a base station; wherein the resource indication information includes first indication information and second indication information; determining target transmission resources corresponding to a target service according to the resource indication information; wherein the first indication information is used to indicate one or more bandwidth parts of the target transmission resources, the one or more bandwidth parts are a portion or all of a total bandwidth, the second indication information is used to indicate location information of Physical Resource Blocks (PRBs) allocated to a terminal in PRBs corresponding to the one or more bandwidth parts; transmitting the target service through the target transmission resources.

In a third aspect, some embodiments of the present disclosure provide a base station. The base station includes an allocation module, configured to allocate corresponding target transmission resources to a terminal in a case that a target service occurs, wherein the target transmission resources include uplink transmission resources or downlink transmission resources; a transmission module, configured to transmit resource indication information to the terminal according to the target transmission resources; wherein the resource indication information includes first indication information and second indication information, the first indication information is used to indicate one or more bandwidth parts of the target transmission resources, the one or more bandwidth parts are a portion or all of a total bandwidth, the second indication information is used to indicate location information of Physical Resource Blocks (PRBs) allocated to the terminal in PRBs corresponding to the one or more bandwidth parts.

In a fourth aspect, some embodiments of the present disclosure provide a terminal. The terminal includes a reception module, configured to receive resource indication information transmitted by a base station; wherein the resource indication information includes first indication information and second indication information; a processing module, configured to determine target transmission resources corresponding to a target service according to the resource indication information; wherein the first indication information is used to indicate one or more bandwidth parts of the target transmission resources, the one or more bandwidth parts are a portion or all of a total bandwidth, the second indication information is used to indicate location information of Physical Resource Blocks (PRBs) allocated to a terminal in PRBs corresponding to the one or more bandwidth parts; a transmission module, configured to transmit the target service through the target transmission resources.

In a fifth aspect, some embodiments of that present disclosure provide a base station. The base station includes a storage, a processor and computer programs stored on the storage and executable on the processor, wherein when the processor executes the computer programs, the processor implements steps of the resource allocation indication method according to the first aspect.

In a sixth aspect, some embodiments of that present disclosure provide a terminal. The terminal includes a storage, a processor and computer programs stored on the storage and executable on the processor, wherein when the processor executes the computer programs, the processor implements steps of the resource allocation indication method according to the second aspect.

In a seventh aspect, some embodiments of the present disclosure provide a computer-readable storage medium. The compute readable storage medium includes computer programs stored on the computer-readable storage medium, wherein when a processor executes the computer programs, the processor implements steps of the resource allocation indication method according the first aspect or the second aspect.

In this way, the base station in the embodiments of the present disclosure flexibly allocates frequency-domain target transmission resources for the target service based on information of terminal capability, and transmits resource indication information used to indicate an allocation result of the target transmission resources to the terminal, so that the terminal may be informed of position information of corresponding frequency-domain resources and the service data may be transmitted in the frequency-domain resources corresponding to the target transmission resources, and an allocation flexibility of the frequency-domain resources and a frequency utilization rate of a system are improved.

BRIEF DESCRIPTION OF THE DRAWINGS

In order to more clearly explain technical solutions of embodiments of the present disclosure, drawings used in description of the embodiments of the present disclosure will be briefly described below. Obviously, the drawings in the description below are only some embodiments of the present disclosure. Those of ordinary skills in the art may obtain other drawings based on these drawings without paying creative labor.

DETAILED DESCRIPTION

Figure 1:
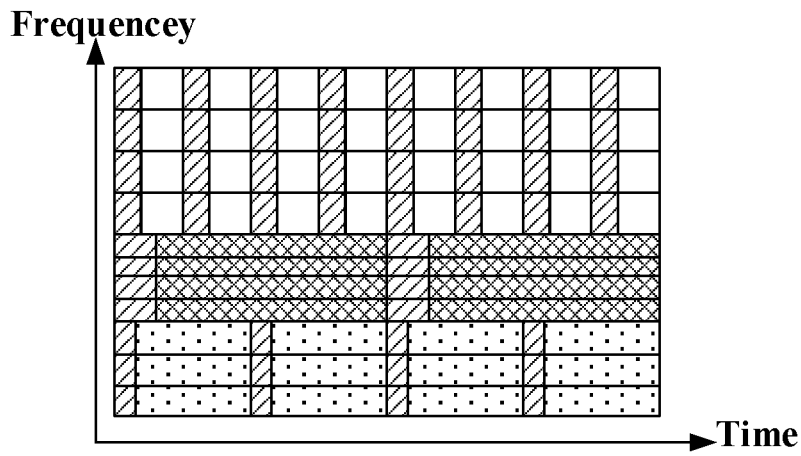
FIG. 1 shows a schematic diagram of radio resources under Numerology of a frequency division multiplexing system.

Exemplary embodiments of the present disclosure will be described in more detail below with reference to accompanying drawings. Although exemplary embodiments of the present disclosure are shown in the drawings, it should be understood that the present disclosure may be implemented in various forms and should not be limited by the embodiments set forth herein. Rather, these embodiments are provided in order to enable a more thorough understanding of the present disclosure and to communicate the scope of the present disclosure to those skilled in the art in its entirety.

In the following embodiments, a resource allocation indication method at a base station side of the present disclosure will be briefly described with reference to the accompanying drawings.

Figure 2:
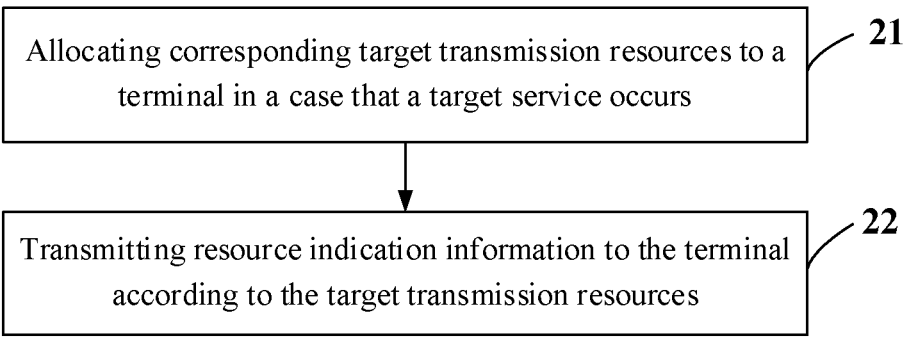
FIG. 2 illustrates a flowchart of a resource allocation indication method of some embodiments of the present disclosure.

As shown in FIG. 2, some embodiments of the present disclosure provide a resource allocation indication method applied to a base station side. Specifically, the method includes the following steps 21-22.

Step 21: allocating corresponding target transmission resources to a terminal in a case that a target service occurs.

Here, the target service includes an uplink service or a downlink service. In a case that the target service occurs, a base station needs to transmit the target service to the terminal or the terminal needs to transmit the target service to the base station. Correspondingly, the target transmission resources include uplink transmission resources or downlink transmission resources. Specifically, in a case that the base station needs to transmit the target service to the terminal, the base station schedules corresponding downlink transmission resources for the target service. In a case that the terminal needs to transmit the target service to the base station, the terminal transmits a scheduling request to the base station; after the base station receives the scheduling request from the terminal, the base station schedules corresponding uplink transmission resources for the target service. Specifically, the base station further receives information of a terminal capability reported by the terminal, the information of the terminal capability being used to indicate one or more bandwidth parts supported by the terminal and the one or more bandwidth parts being a portion or all of a total bandwidth. In a case that the target service occurs, the base station allocates target transmission resources corresponding to the target service based on the information of the terminal capability of the terminal, so as to improve allocation flexibility of frequency domain resources of the system.

Step 22: transmitting resource indication information to the terminal according to the target transmission resources.

The resource indication information includes first indication information and second indication information. The first indication information is used to indicate one or more bandwidth parts of the target transmission resources, the one or more bandwidth parts being a portion or all of the total bandwidth. The second indication information is used to indicate location information of Physical Resource Blocks (PRBs) allocated to the terminal in PRBs corresponding to the one or more bandwidth parts. Specifically, the base station may indicate the target transmission resources corresponding to the target service for the terminal in two steps based on the target transmission resources. A first step of the two steps is a bandwidth part indication, which may be a semi-static indication or a dynamic indication. The second step of the two steps is an indication of location information of the PRBs allocated to the terminal in the PRBs corresponding to the one or more bandwidth parts, wherein the indication may be a dynamic indication.

In the resource allocation indication method according to the embodiments of the present disclosure, the base station flexibly allocates frequency-domain target transmission resources to the target service based on the information of the terminal capability, and transmits, to the terminal, resource indication information used to indicate an allocation result of the target transmission resources, so that the terminal may be informed of frequency-domain position information corresponding to the target transmission resources, and service data may be transmitted in frequency domain resources corresponding to the target transmission resources, thereby improving the allocation flexibility of the frequency domain resources and a frequency utilization rate of the system.

The resource allocation indication method of the present disclosure is briefly described in the above embodiments, and will be further described below in conjunction with the drawings and specific application scenarios of the present disclosure.

First Mode

Figure 3:
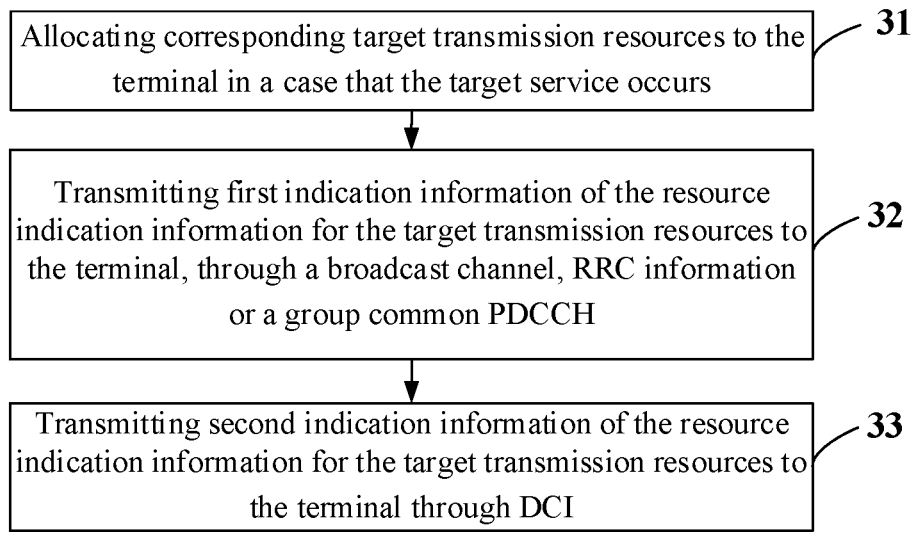
FIG. 3 illustrates a flowchart of a resource allocation indication method of some embodiments of the present disclosure.

In this mode, the indication of the first step is a semi-static indication and the indication of the second step is a dynamic indication. As shown in FIG. 3, the resource allocation indication method accord to the embodiments of the present disclosure is applied to the base station side, and specifically includes the following steps 31-33.

Step 31: allocating corresponding target transmission resources to the terminal in a case that the target service occurs.

Here, in a case that that base station needs to transmit the target service to the terminal, the base station schedules corresponding downlink transmission resources for the target service. In a case that the terminal needs to transmit the target service to the base station, the terminal transmits a scheduling request to the base station; after the base station receives the scheduling request from the terminal, the base station schedules corresponding uplink transmission resources for the target service. Further, the base station also receives information of the terminal capability reported by the terminal, and allocates the corresponding target transmission resources for the target service based on information of the terminal capability of the terminal in a case that the target service occurs, so as to improve the allocation flexibility of the frequency domain resources of the system.

Step 32: transmitting first indication information of the resource indication information for the target transmission resources to the terminal through a broadcast channel, Radio resource control (RRC) information or a periodic group common Physical Downlink Control Channel (group common PDCCH).

Step 33: transmitting second indication information of the resource indication information for the target transmission resources to the terminal through Downlink Control Information (DCI).

The DCI includes one-stage DCI or any DCI of a two-stage DCI. For the one-stage DCI, the one-stage DCI is directly used to indicate the second indication information for the target transmission resources. For the two-stage DCI, the second indication information for the target transmission resources may be indicated by a first stage DCI or a second stage DCI.

The above example is an example in which a semi-static bandwidth part indication+a dynamic PRB indication are used, and an example 2 will be further described with reference to the drawings.

Second Mode

Figure 4:
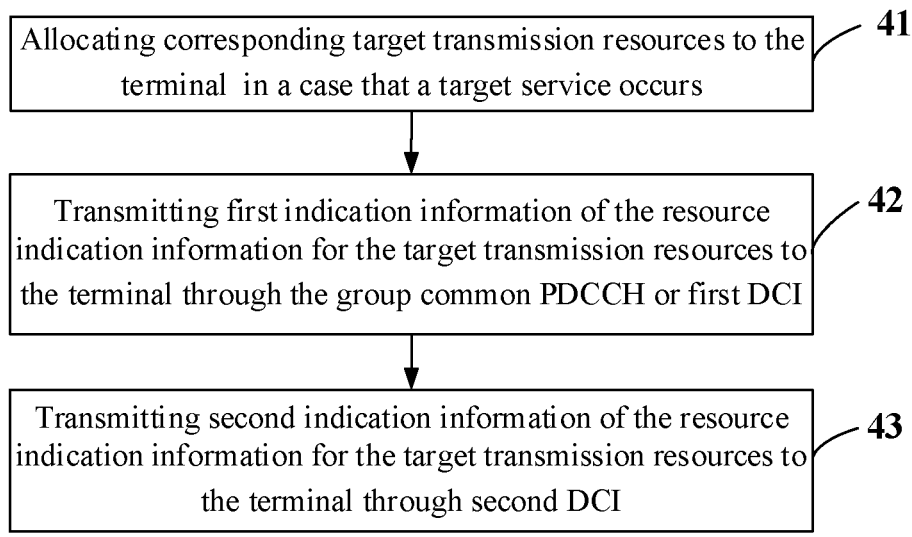
FIG. 4 illustrates a flowchart of a resource allocation indication method of some embodiments of the present disclosure.

In this mode, the indication in the first step is a dynamic indication and the indication in the second step is a dynamic indication. As shown in FIG. 4, the resource allocation indication method of the embodiments of the present disclosure is applied to the base station side, and specifically includes the following steps 41-43.

Step 41: allocating corresponding target transmission resources to the terminal in a case that a target service occurs.

Here, in a case that that base station needs to transmit the target service to the terminal, the base station schedules corresponding downlink transmission resources for the target service. In a case that the terminal needs to transmit the target service to the base station, the terminal transmits a scheduling request to the base station; after the base station receives the scheduling request from the terminal, the base station schedules corresponding uplink transmission resources for the target service. Specifically, the base station receives information of the terminal capability reported by the terminal, and information of the terminal capability is used to indicate a bandwidth part supported by the terminal, and the bandwidth part is a part or all of the total bandwidth.

Step 42: transmitting first indication information of the resource indication information for the target transmission resources to the terminal through the group common PDCCH or first DCI.

The first DCI includes one-stage DCI or any DCI of a two-stage DCI.

Step 43: transmitting second indication information of the resource indication information for the target transmission resources to the terminal through second DCI.

The second DCI includes one-stage DCI or any DCI of a two-stage DCI.

Specifically, if the first DCI is the one-stage DCI, the second DCI and the first DCI are transmitted through same DCI; or, if the first DCI is the first stage DCI of the two-stage DCI, the second DCI is any DCI of the two-stage DCI; or, if the first DCI is the second stage DCI of the two-stage DCI, the second DCI is the second stage DCI of the two-stage DCI.

That is, for the one-stage DCI, the bandwidth part and the location information of PRBs allocated to the terminal in PRBs of the bandwidth part are indicated by the one-stage DCI. Optionally, the bandwidth part is indicated by the group common PDCCH, and the location information of the PRBs allocated to the terminal in the PRBs of the bandwidth part is indicated by the one-stage DCI.

For the two-stage DCI, the bandwidth part is indicated by DCI in the first stage of the two-stage DCI (first stage DCI), and the location information of the PRBs allocated to the terminal in the PRBs of the bandwidth part is indicated by DCI in the second stage of the two-stage DCI (second stage DCI).

For the two-stage DCI, the bandwidth part and the location information of PRBs allocated to the terminal in the PRBs in the bandwidth part may also be indicated by the DCI in the first stage DCI (the first stage DCI) or the DCI in the second stage DCI (second stage DCI).

For the two-stage DCI, the bandwidth part is indicated by the group common PDCCH, and the location information of the PRBs allocated to the terminal in the PRBs in the bandwidth part is indicated by DCI in the first stage (first stage DCI) or DCI in the second stage (second stage DCI).

The above scenario is a scenario in which the terminal supports only one bandwidth part. A scenario in which the terminal supports multiple bandwidth parts will be described below in conjunction with the accompanying drawings.

Figure 5:
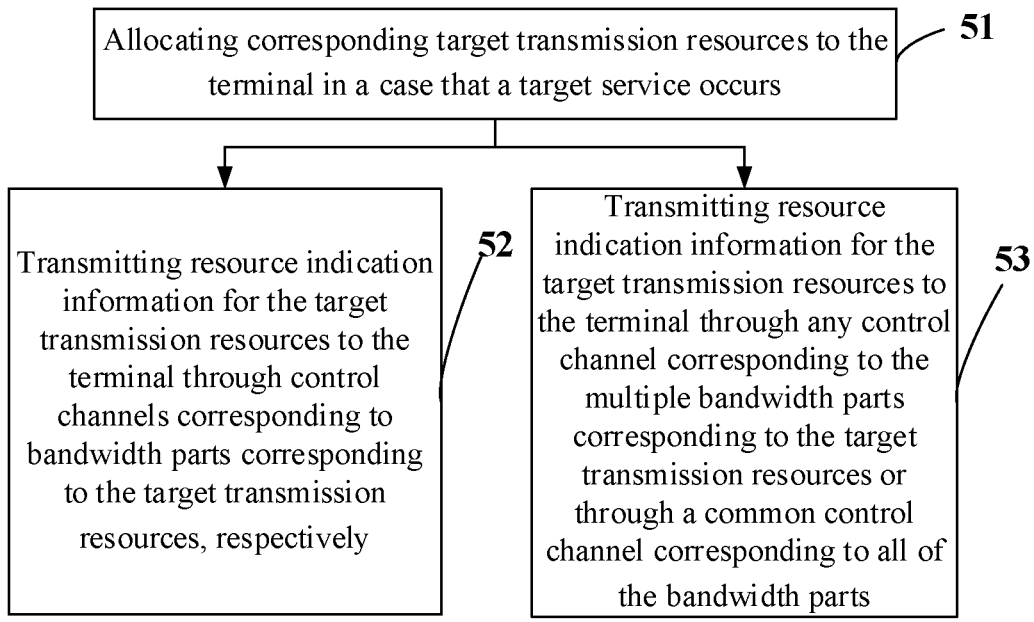
FIG. 5 illustrates a flowchart of a resource allocation indication method of some embodiments of the present disclosure.

As shown in FIG. 5, the resource allocation indication method of the embodiments of the present disclosure is applied to the base station side, and specifically includes the following steps 51-53.

Step 51: allocating corresponding target transmission resources to the terminal in a case that a target service occurs.

Here, in a case that that base station needs to transmit the target service to the terminal, the base station schedules corresponding downlink transmission resources for the target service. In a case that the terminal needs to transmit the target service to the base station, the terminal transmits a scheduling request to the base station; after the base station receives the scheduling request from the terminal, the base station schedules corresponding uplink transmission resources for the target service, especially schedules frequency-domain resources.

Step 52: transmitting resource indication information for the target transmission resources to the terminal through control channels corresponding to multiple bandwidth parts corresponding to the target transmission resources, respectively.

Figure 6:
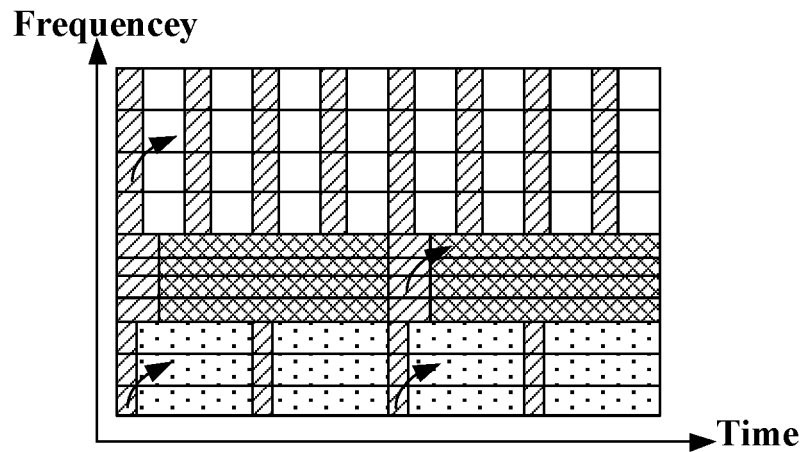
FIG. 6 shows an indication schematic diagram of a control channel of a step 52 in FIG. 5.

In a case that the terminal supports two or more than two bandwidth parts simultaneously, and if each of the bandwidth parts has a control channel corresponding to the bandwidth part, the as shown in FIG. 6, the target transmission resources may be indicated in the control channels corresponding to the bandwidth parts, respectively. An indication method for the target transmission resources may be any one of the above-described methods in the first mode and the second mode.

Step 53: transmitting resource indication information for the target transmission resources to the terminal through any control channel corresponding to the multiple bandwidth parts corresponding to the target transmission resources or through a common control channel corresponding to all of the bandwidth parts.

Figure 7:
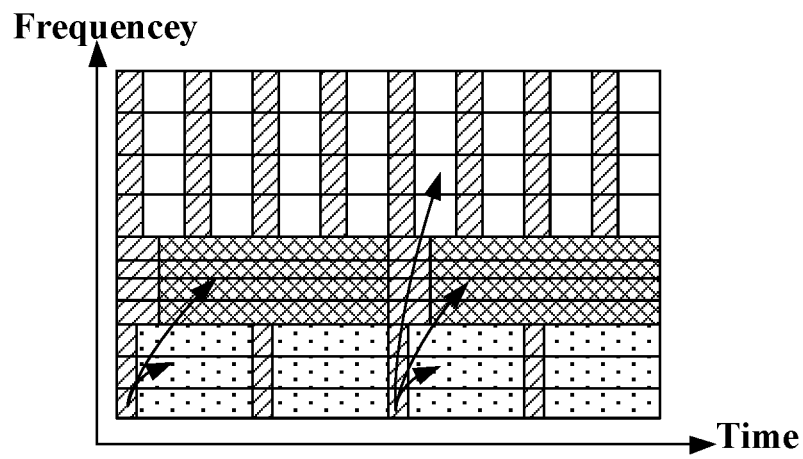
FIG. 7 shows an indication schematic diagram of a control channel of a step 53 in FIG. 5.
Figure 8:
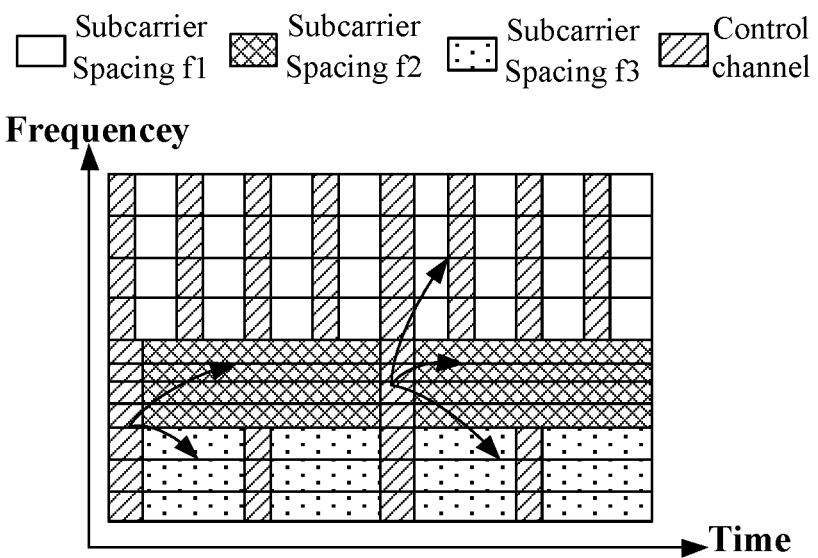
FIG. 8 shows an indication schematic diagram of a control channel of a step 53 in FIG. 5.

In a case that the terminal supports two or more than two bandwidth parts simultaneously, one control channel may also be used to indicate all of the bandwidth parts simultaneously. As shown in FIG. 7, the control channel may be a control channel corresponding to any one of the bandwidth parts; or the control channel may be a common control channel commonly used by all of the bandwidth parts, as shown in FIG. 8.

That is, bandwidth part information in the resource indication information may be indicated through a broadcast channel, a RRC, or a periodic group common PDCCH. The location information of PRBs allocated to the terminal in the PRBs corresponding to each of the bandwidth parts may be transmitted in one-stage DCI or any DCI of a two-stage DCI in a control channel corresponding to any one of the bandwidth parts or in a second stage DCI in a data channel corresponding to the bandwidth parts.

Optionally, the bandwidth part information in the resource indication information may be indicated by a broadcast channel, an RRC, or a periodic group common PDCCH. The location information of the PRBs allocated to the terminal in the PRBs corresponding to each of the bandwidth parts may be transmitted in one-stage DCI or any one of two-stage DCI in the common control channel or in the second stage DCI in the data channel corresponding to the bandwidth parts.

In particular, assuming that information about all of the bandwidth parts in the resource indication information is indicated by the group common PDCCH. Location information of PRBs allocated to the terminal in PRBs corresponding to each of the bandwidth parts may be transmitted in DCI in a control channel corresponding to any one of the bandwidth parts, or transmitted in DCI in a common control channel corresponding to the bandwidth parts. Whether the DCI in the control channel corresponding to any one of the bandwidth parts or the DCI in the common control channel corresponding to the bandwidth parts may be one-stage DCI or any one of two-stage DCI. Assuming that the second indication information is transmitted in the second stage DCI in the two-stage DCI, if the second stage DCI is in the data channel, then PRB allocation information for each of the bandwidth parts may be indicated by second stage DCI in the data channel for the bandwidth.

The resource indication information (the first indication information and the second indication information) may also be transmitted through the DCI. If one-stage DCI is used, information of all of the bandwidth parts and the location information of the PRBs allocated to the terminal in the PRBs corresponding to each of the bandwidth parts are indicated by the DCI. If two-stage DCI are used, the first stage DCI in the control channel is used to indicate all of the bandwidth parts allocated to the terminal; if the second stage DCI is also in the control channel, then the location information of the PRBs allocated to the terminal in the PRBs corresponding to each of the bandwidth parts is indicated by the second stage DCI in the control channel. If the second stage DCI is in the data channel, the PRB allocation information of each of the bandwidth parts may be indicated by the second stage DCI in the data channel of the bandwidth part.

Specific implementation methods in different indication modes are respectively described above in respect of scenarios in which the terminal supports only one bandwidth part and multiple bandwidth parts, respectively, specific forms of the resource indication information will be further described below in conjunction with specific examples.

Specifically, the first indication information includes a first bit group. A plurality of bits in the first bit group correspond to different bandwidth parts, respectively. The number of bits in the first bit group is the number of bandwidth parts supported by the base station. For example, the base station supports 5 bandwidth parts, then 5 bits are required and the first bit group in the first indication information includes 5 bits, a value "1" for each of the 5 bits indicates that data is transmitted in the bandwidth part, and a value "0" for each of the 5 bits indicates that data is not transmitted in the bandwidth part. For example, 10001 represents transmitting data simultaneously at a bandwidth part 1 and a bandwidth part 5, and 00100 represents transmitting data at a bandwidth part 3.

Optionally, the first indication information includes at least one second bit group. The number of the at least one second bit group is the maximum number of bandwidth parts supported by the terminal, and different values of the at least one second bit group correspond to different bandwidth parts. This indication mode is a bitmap indication mode, i.e., different bandwidth parts are mapped onto the bitmap, and this mapping relationship may be defined by a standard protocol, or configured according to a bandwidth allocation result. For example, for a 10 MHz bandwidth at a left most side of the system bandwidth, resources having a subcarrier spacing of 15 kHz are defined as the bandwidth part 1 and is mapped to 000; for a bandwidth of 5 MHz adjacent to the 10 MHz at a right side of the 10 MHz, resources having the 30 kHz subcarrier spacing are defined as the bandwidth part 2 and are mapped to 001, and so on. This mapping relationship may be transmitted to the terminal via the broadcast channel or the RRC. Therefore, the number of the at least one second bit group (or a size of the bitmap indicating the bandwidth parts) is determined by the maximum number of bandwidth parts supported by the terminal simultaneously and the number of bandwidth parts available by the system. In a case that the maximum number of bandwidth parts supported by the terminal simultaneously is 1, this case means a single bandwidth. For example, the system has five bandwidth parts mapped to 000-100, respectively, remaining bits are invalid bits, as shown in a table below.

| Indication | 000 | ... | 100 | 101~111 |
|---|---|---|---|---|
| Mapping Indication | BWP 1 | ... | BWP 5 | Invalid bits |

Assuming that the terminal performs transmission at three bandwidth parts at most simultaneously, 3 bit groups, i.e. 9 bits, are required to indicate the bandwidth parts. For example, the first indication information includes an indication bit sequence 000100111, which indicates that two transmission bandwidths are allocated to the terminal and correspond to the bandwidth part 1 and the bandwidth part 5, respectively. If the terminal supports at most one bandwidth part simultaneously, only a 3-bit indication is required to indicate the bandwidth part.

Further, the first indication information further includes at least one of resource location information, bandwidth information, numerology information (Numerology), and cyclic prefix (CP) information of bandwidth parts corresponding to the target transmission resources. The first indication information may indicate the resource location information and/or the bandwidth information of the bandwidth parts in the following indication manner: a first indication mode: a subcarrier index or a PRB index at a frequency-domain start position+a subcarrier index or a PRB index of a frequency-domain end position; a second indication mode 2: a bandwidth+the subcarrier index or the PRB index of the frequency-domain start position; a third indication mode: the bandwidth+a center-frequency index or a center-subcarrier index or a center-PRB index. It should be noted that the first indication information may be directly transmitted to the terminal through the broadcast channel or the RRC signaling or the group common PDCCH or the DCI. In a case that the first indication information is transmitted through the DCI, the first indication information may be transmitted in a previous slot or in a current slot.

The embodiments of the present disclosure are applicable to a frequency-domain resource allocation in multiplexing all numerologies, and the frequency-domain resource allocation includes a downlink resource allocation and an uplink resource allocation and may include frequency domain resource allocations across subframes, across timeslots, across sub-timeslots, and across carrier aggregation, and may include frequency-domain resource allocations in a carrier aggregation (CA) scene or in a dual-connection or multiple-connection scene, such as indicating frequency-domain resource allocations in the component carrier-aggregation scene/dual-connection scene in low-frequency narrowband and a high-frequency wideband, a licensed frequency band and an unlicensed frequency band. In addition, the present disclosure is also applicable to scenarios such as a scenario having a single carrier and a large bandwidth, and a scenario in which the NR and the Long Term Evolution (LTE) coexist, for example, in a scenario in which a NR carrier schedules LTE inactive component carriers, the present disclosure may be used to instruct a terminal to transmit data on a carrier of the LTE. In addition, in a case of a single narrowband/wideband Radio Frequency (RF) or two or more RFs of a terminal, the present disclosure may also be used to indicate the base station to assign which of the RFs to the terminal.

In the resource allocation indication method of the embodiments of the present disclosure, the base station flexibly allocates frequency-domain target transmission resources for the target service based on the information of the terminal capability, and transmits resource indication information used to indicate an allocation result of the target transmission resources to the terminal by semi-statically indicating the first indication information and dynamically indicating the second indication information or dynamically indicating the first indication information and the second indication information, so that the terminal may be informed of position information of corresponding frequency-domain resources and the service data may be transmitted in the frequency-domain resources corresponding to the target transmission resources, and the allocation flexibility of the frequency-domain resources and the frequency utilization rate of the system are improved.

The resource allocation indication method in different scenarios is described in detail in the above embodiments, and a corresponding base station will be further described in connection with the drawings in the following embodiments.

Figure 9:
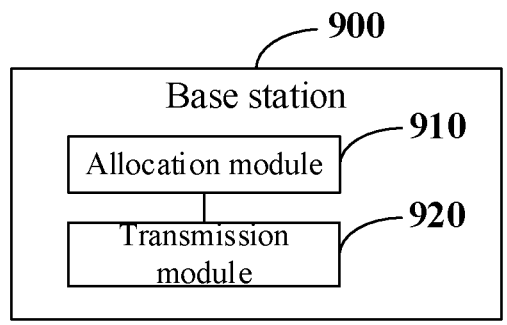
FIG. 9 shows a schematic structural diagram of a base station in some embodiments of the present disclosure.

As shown in FIG. 9, a base station 900 according to the embodiments of the present disclosure may implement details of the resource allocation indication method in the above embodiments, which includes allocating corresponding target transmission resources for a terminal in a case that a target service occurs, the target transmission resources including uplink transmission resources or downlink transmission resources; transmitting resource indication information to the terminal according to the target transmission resources, and achieves the same effect as that in the above resource allocation indication method, wherein the resource indication information includes first indication information and second indication information, the first indication information is used to indicate one or more bandwidth parts of the target transmission resources, the one or more bandwidth parts being a portion or all of the total bandwidth, the second indication information is used to indicate the location information of PRBs allocated to the terminal in PRBs corresponding to the one or more bandwidth parts. The base station 900 specifically includes an allocation module 910 and a transmission module 920. The allocation module 910 is configured to allocate corresponding target transmission resources for a terminal in a case that a target service occurs, the target transmission resources including uplink transmission resources or downlink transmission resources. The transmission module 920 is configured to transmit resource indication information to the terminal according to the target transmission resources; wherein the resource indication information includes first indication information and second indication information. The first indication information is used to indicate one or more bandwidth parts of the target transmission resources, the one or more bandwidth parts being a portion or all of the total bandwidth. The second indication information is used to indicate the location information of PRBs allocated to the terminal in the PRBs corresponding to the one or more bandwidth parts.

Figure 10:
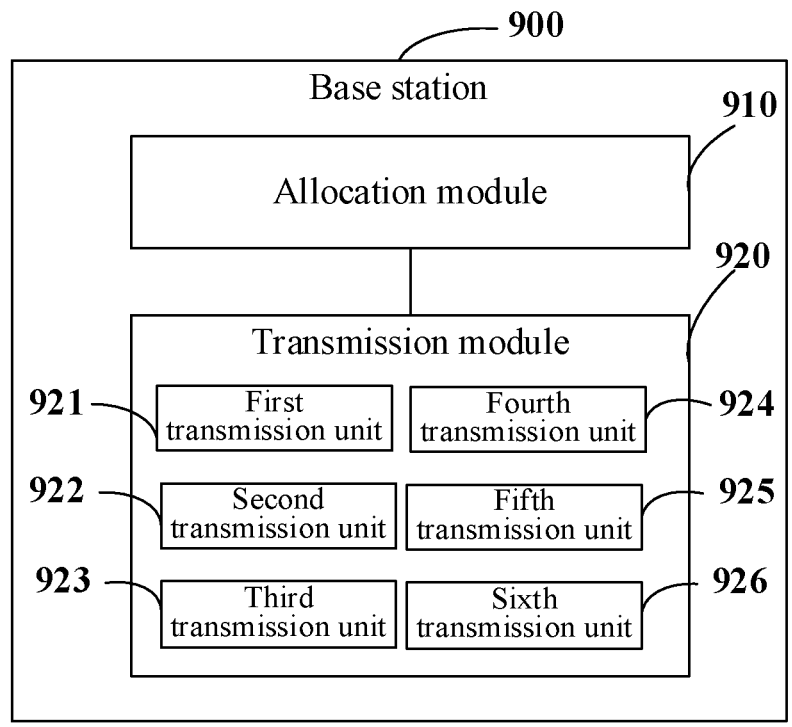
FIG. 10 shows a schematic structural diagram of a base station in some embodiments of the present disclosure.

As shown in FIG. 10, the transmission module 920 includes a first transmission unit 921 and a second transmission unit 922. The first transmission unit 921 is configured to transmit, to the terminal via a broadcast channel, a Radio Resource Control (RRC) information or a periodic group common Physical Downlink Control Channel (group common PDCCH), first indication information of the resource indication information for the target transmission resources. The second transmission unit 922 is configured to transmit, to the terminal through DCI, second indication information of the resource indication information for the target transmission resources. The DCI includes one-stage DCI or any DCI of a two-stage DCI.

The transmission module 920 includes a third transmission unit 923 and a fourth transmission unit 924. The third transmission unit 923 is configured to transmit, through the group common PDCCH or the first DCI, first indication information of the resource indication information for the target transmission resources to the terminal; wherein, the first DCI includes one-stage DCI or any DCI of a two-stage DCI. The fourth transmission unit 924 is configured to transmit second indication information of the resource indication information for the target transmission resources to the terminal through the second DCI; the second DCI includes one-stage DCI or any DCI of a two-stage DCI.

If the first DCI is the one-stage DCI, the second DCI and the first DCI are transmitted through same DCI; or, if the first DCI is a first stage DCI of the two-stage DCI, the second DCI is any DCI of the two-stage DCI; or, if the first DCI is a second stage DCI of the two-stage DCI, the second DCI is the second stage DCI of the two-stage DCI.

If the target transmission resources correspond to two or more than two bandwidth parts, the transmission module 920 includes a fifth transmission unit 925 or a sixth transmission unit 926. The fifth transmission unit 925 is configured to transmit the resource indication information for the target transmission resources to the terminal through a control channel corresponding to each of the bandwidth parts corresponding to the target transmission resources; the sixth transmission unit 926 is configured to transmit the resource indication information for the target transmission resources to the terminal through any control channel corresponding to the bandwidth parts corresponding to the target transmission resources or through a common control channel corresponding to all of the bandwidth parts.

The first indication information includes a first bit group. A plurality of bits in the first bit group correspond to different bandwidth parts, respectively.

The first indication information includes at least one second bit group. The number of groups represented by the at least one second bit group is the maximum number of bandwidth parts supported by the terminal, and different values of the at least one second bit group correspond to different bandwidth parts.

The first indication information includes at least one of resource location information, bandwidth information, numerology information (Numerology), and cyclic prefix (CP) information of bandwidth parts corresponding to the target transmission resources.

It should be noted that the base station of the embodiments of the present disclosure flexibly allocates frequency-domain target transmission resources for the target service based on the information of the terminal capability, and transmits resource indication information used to indicate an allocation result of the target transmission resources to the terminal, so that the terminal may be informed of position information of corresponding frequency-domain resources and the service data may be transmitted in the frequency-domain resources corresponding to the target transmission resources, and the allocation flexibility of the frequency-domain resources and the frequency utilization rate of the system are improved.

Figure 11:
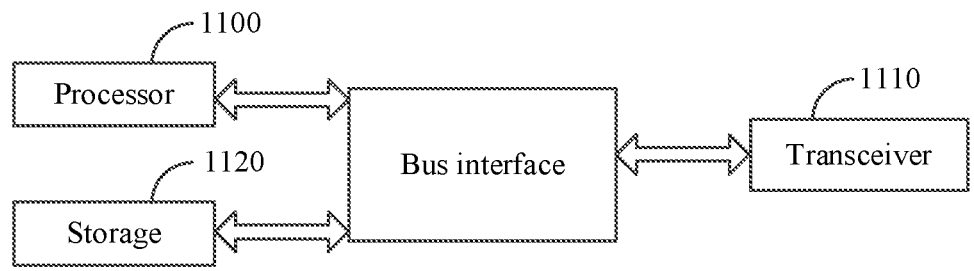
FIG. 11 shows a block diagram of a base station of some embodiments of the present disclosure.

To better achieve the above objective, as shown in FIG. 11, some embodiments of the present disclosure further provide a base station. The base station includes a processor 1100, a storage 1120 connected to the processor 1100 through a bus interface, and a transceiver 1110 connected to the processor 1100 through a bus interface. The storage 1120 is configured to store programs and data used by the processor when the processor performs operations. The transceiver 1110 is configured to transmit data information or pilots and receive an uplink control channel. In a case that the processor 1100 invokes and executes programs and data stored in the storage 1120, specifically, the processor 1100 is used to read the programs in the storage 1120 and specifically to perform the following functions: in a case that a target service occurs, allocating corresponding target transmission resources to a terminal, and the target transmission resources include uplink transmission resources or downlink transmission resources. The transceiver 1110 is configured to receive and transmit data under a control of the processor 1100, and is specifically configured to transmit resource indication information to the terminal based on the target transmission resources, wherein the resource indication information includes first indication information and second indication information, the first indication information is used to indicate one or more bandwidth parts of the target transmission resources, the one or more bandwidth parts being a portion or all of the total bandwidth; the second indication information is used to indicate location information of Physical Resource Blocks (PRBs) allocated to the terminal in PRBs corresponding to the one or more bandwidth parts.

In FIG. 11, a bus architecture may include any number of interconnected buses and bridges, specifically various circuits such as one or more processors represented by the processor 1100 and a storage represented by the storage 1120 are connected through the bus architecture. The bus architecture may also link together various other circuits such as peripheral devices, voltage regulators, and power management circuits, etc., which are well known in the art and therefore will not be further described herein. A bus interface provides an interface. The transceiver 1110 may be a plurality of elements, i.e., a transmitter and a receiver, which provide units for communicating with various other devices over a transmission medium. The processor 1100 is responsible for managing the bus architecture and general processing, and the storage 1120 may store data used by the processor 1100 when the processor 1100 performs operations.

In particular, the processor 1100 is further configured to control the transceiver 1110 to, through a broadcast channel, Radio resource control (RRC) information or a periodic group common Physical Downlink Control Channel (group common PDCCH), transmit first indication information of the resource indication information for the target transmission resources to the terminal; transmit second indication information of the resource indication information for the target transmission resources to the terminal through Downlink Control Information (DCI), wherein the DCI includes one-stage DCI or any DCI of two-stage DCI.

In particular, the processor 1100 is further configured to control the transceiver 1110 to: transmit first indication information of the resource indication information for the target transmission resources to the terminal through the group common PDCCH or first DCI, wherein the first DCI includes one-stage DCI or any DCI of a two-stage DCI; transmit second indication information of the resource indication information for the target transmission resources to the terminal through second DCI, the second DCI includes one-stage DCI or any DCI of a two-stage DCI.

If the first DCI is the one-stage DCI, the second DCI and the first DCI are transmitted through same DCI; or, if the first DCI is a first stage DCI of the two-stage DCI, the second DCI is any DCI of the two-stage DCI; or, if the first DCI is a second stage DCI of the two-stage DCI, the second DCI is the second stage DCI of the two-stage DCI.

Specifically, if the target transmission resources correspond to multiple bandwidth parts, the processor 1100 is further configured to control the transceiver 1110 to: transmit resource indication information for the target transmission resources to the terminal through control channels corresponding to multiple bandwidth parts corresponding to the target transmission resources, respectively; or transmit resource indication information for the target transmission resources to the terminal through any control channel corresponding to the bandwidth parts corresponding to the target transmission resources or through a common control channel corresponding to all of the bandwidth parts.

The first indication information includes a first bit group. A plurality of bits in the first bit group correspond to different bandwidth parts, respectively.

The first indication information includes at least one second bit group. The number of the at least one second bit group is the maximum number of bandwidth parts supported by the terminal, and different values of the at least one second bit group correspond to different bandwidth parts.

The first indication information includes at least one of resource location information, bandwidth information, numerology information (Numerology), and cyclic prefix (CP) information of bandwidth parts corresponding to the target transmission resources.

The base station according to the embodiments of the present disclosure flexibly allocates frequency-domain target transmission resources to the target service based on the information of the terminal capability, and transmits, to the terminal, resource indication information used to indicate an allocation result of the target transmission resources, so that the terminal may be informed of frequency-domain position information corresponding to the target transmission resources, and service data may be transmitted in frequency domain resources corresponding to the target transmission resources, thereby improving the allocation flexibility of the frequency domain resources and a frequency utilization rate of the system.

The above embodiments introduce the resource allocation indication method at the base station side of the present disclosure, and the following embodiments further introduce the resource allocation indication method at a terminal side in conjunction with the drawings.

Figure 12:
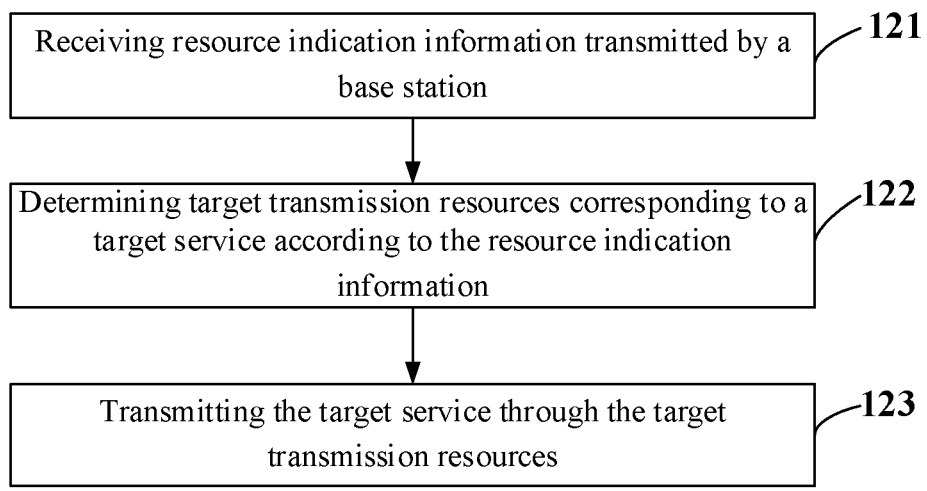
FIG. 12 illustrates a flowchart of a resource allocation indication method of some embodiments of the present disclosure.

As shown in FIG. 12, the resource allocation indication method of the embodiments of the present disclosure is applied to the terminal side, and specifically includes the following steps 121-123.

Step 121: receiving resource indication information transmitted by a base station.

The resource indication information includes first indication information and second indication information. Specifically, the base station may indicate target transmission resources allocated to the terminal in two steps according to the target transmission resources, and the target transmission resources include uplink transmission resources or downlink transmission resources. The first step of the two steps is an indication of one or more bandwidth parts, which may be a semi-static or dynamic indication; the second step of the two steps is an indication of location information of PRBs allocated to the terminal in PRBs corresponding to one or more bandwidth parts and may be a dynamic indication.

Step 122: determining target transmission resources corresponding to a target service according to the resource indication information.

The first indication information is used to indicate the one or more bandwidth parts of the target transmission resources, the one or more bandwidth parts being a portion or all of the total bandwidth; the second indication information is used to indicate location information of PRBs allocated to the terminal in the PRBs corresponding to the one or more bandwidth parts. The terminal may determine the target transmission resources allocated by the base station for the target service based on the first indication information and the second indication information of the resource indication information. In a case that the base station needs to transmit the target service to the terminal, the base station schedules corresponding downlink transmission resources for the target service. In a case that the terminal needs to transmit the target service to the base station, the terminal transmits a scheduling request to the base station; and after the base station receives the scheduling request from the terminal, the base station schedules corresponding uplink transmission resources for the terminal. Specifically, the base station further receives information of a terminal capability reported by the terminal, the information of the terminal capability being used to indicate one or more bandwidth parts supported by the terminal and the one or more bandwidth parts being a portion or all of a total bandwidth. In a case that the target service occurs, the base station allocates target transmission resources corresponding to the target service based on the information of the terminal capability of the terminal, so as to improve allocation flexibility of frequency domain resources of the system.

Step 123: transmitting the corresponding target service through the target transmission resources.

After the terminal acquires the target transmission resources corresponding to the target service, the terminal uses the target transmission resources to transmit the target service. The transmission herein includes both the uplink transmission and the downlink transmission. That is, in a case that the target service is a uplink service, the terminal transmits service data of the uplink service to the base station through the target transmission resources; and in a case that the target service is a downlink service, the terminal receives, through the target transmission resources, service data of the downlink service transmitted by the base station.

According to the resource allocation indication method of the embodiments of the present disclosure, the terminal receives the resource indication information transmitted by the base station, is informed of the target transmission resources allocated by the base station to the terminal based on the resource indication information, and further the service data is transmitted in the frequency-domain resources corresponding to the target transmission resources, thus the allocation flexibility of the frequency-domain resources and the frequency utilization rate of the system are enhanced.

The above embodiments provide a brief introduction to the resource allocation indication method of the present disclosure, which will be further described below in conjunction with the drawings and specific application scenarios.

Figure 13:
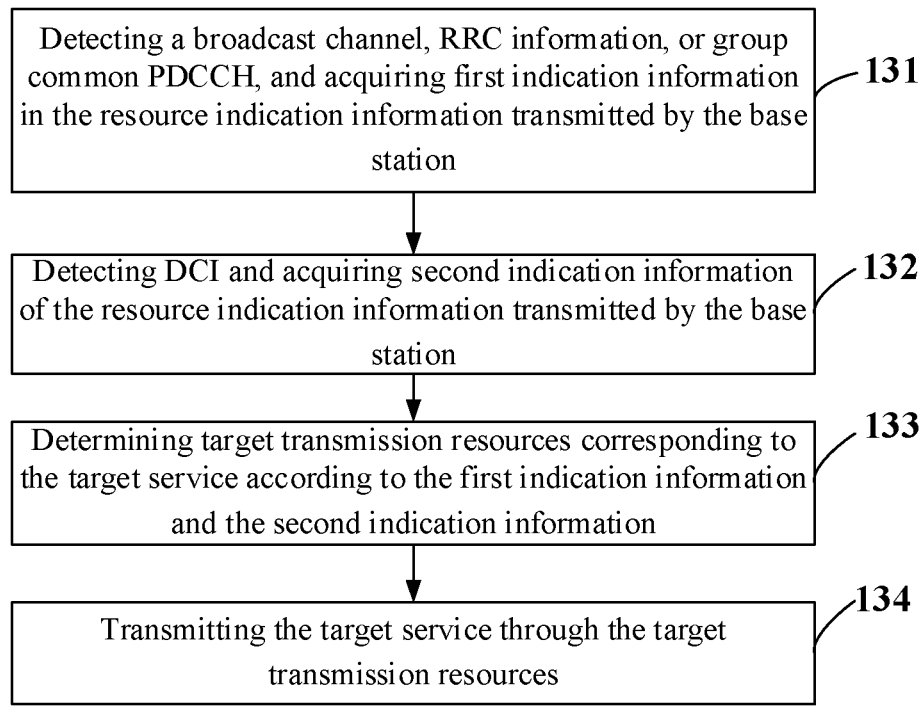
FIG. 13 illustrates a flowchart of a resource allocation indication method of some embodiments of the present disclosure.

Corresponding to the first mode in the above embodiments, the base station indicates the target transmission resources in two steps, wherein an indication of the first step of the two steps is a semi-static indication and an indication of the second step is a dynamic indication. As shown in FIG. 13, the resource allocation indication method of the embodiments of the present disclosure is applied to the terminal side, and specifically includes the following steps 131-134.

Step 131: detecting a broadcast channel, Radio Resource Control (RRC) information, or a periodic group common Physical Downlink Control Channel (group common PDCCH), and acquiring first indication information of the resource indication information transmitted by the base station.

Step 132: detecting DCI and acquiring second indication information of the resource indication information transmitted by the base station.

The DCI includes one-stage DCI or any DCI of a two-stage DCI. For the one-stage DCI (one-stage DCI), a one-stage DCI is directly detected to acquire the second indication information indicating the target transmission resources. For the two-stage DCI (two-stage DCI), a first stage DCI and a second stage DCI are detected respectively to acquire the second indication information indicating the target transmission resources.

Step 133: determining target transmission resources corresponding to the target service according to the first indication information and the second indication information.

The terminal may determine, based on the first indication information and the second indication information of the resource indication information, the target transmission resources allocated by the base station for the target service, wherein the base station schedules corresponding target transmission resources for the terminal in a case that the target service occurs.

Step 134: transmitting the corresponding target service through the target transmission resources.

After the terminal acquires the target transmission resources corresponding to the target service, the terminal uses the target transmission resources to transmit the target service.

A mode corresponding to the first mode (the mode including a semi-static bandwidth-part indication+a dynamic PRB indication) is described above, and a mode corresponding to the second mode (both the first step and the second step are dynamic indications) will be described below with reference to the drawings.

Figure 14:
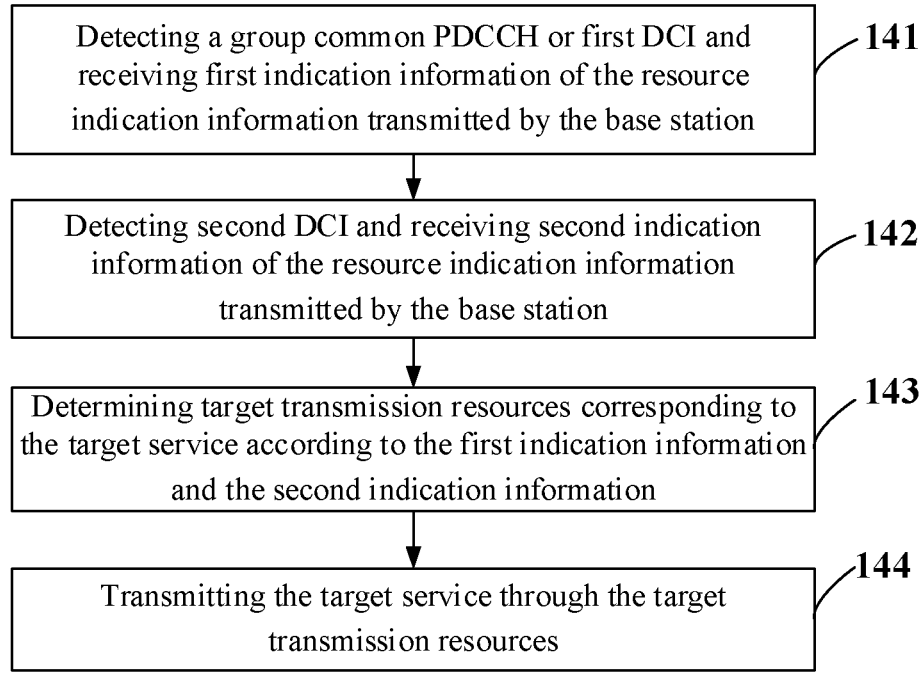
FIG. 14 illustrates a flowchart of a resource allocation indication method of some embodiments of the present disclosure.

As shown in FIG. 14, the resource allocation indication method of the embodiments of the present disclosure specifically includes the following steps 141-144.

Step 141: detecting a group common PDCCH or first DCI and receiving first indication information of the resource indication information transmitted by the base station.

The first DCI includes one-stage DCI or any DCI of a two-stage DCI.

Step 142: detecting second DCI and receiving second indication information of the resource indication information transmitted by the base station.

The second DCI includes one-stage DCI or any DCI of a two-stage DCI.

Step 143: determining target transmission resources corresponding to the target service according to the first indication information and the second indication information.

Step 144: transmitting the corresponding target service through the target transmission resources.

Specifically, if the first DCI is the one-stage DCI, then the second DCI and the first DCI are transmitted through same DCI; or, if the first DCI is a first stage DCI of the two-stage DCI, then the second DCI is any DCI of the two-stage DCI; or, if the first DCI is a second stage DCI of the two-stage DCI, then the second DCI is the second stage DCI of the two-stage DCI.

That is, for the one-stage DCI, the bandwidth part and the location information of PRBs allocated to the terminal in PRBs of the bandwidth part are indicated by the one-stage DCI. Optionally, the bandwidth part is indicated by the group common PDCCH, and the location information of the PRBs allocated to the terminal in the PRBs of the bandwidth part is indicated by the one-stage DCI.

For the two-stage DCI, the bandwidth part is indicated by DCI in the first stage of the two-stage DCI (first stage DCI), and the location information of the PRBs allocated to the terminal in the PRBs of the bandwidth part is indicated by DCI in the second stage of the two-stage DCI (second stage DCI).

For the two-stage DCI, the bandwidth part and the location information of PRBs allocated to the terminal in the PRBs in the bandwidth part may also be indicated by the DCI in the first stage DCI (the first stage DCI) or the DCI in the second stage DCI (second stage DCI).

For the two-stage DCI, the bandwidth part is indicated by the group common PDCCH, and the location information of the PRBs allocated to the terminal in the PRBs in the bandwidth part is indicated by DCI in the first stage (first stage DCI) or DCI in the second stage (second stage DCI).

The above scenario is a scenario in which the terminal supports only one bandwidth part, and a scenario in which the terminal supports multiple bandwidth parts will be described below in conjunction with the accompanying drawings.

Figure 15:
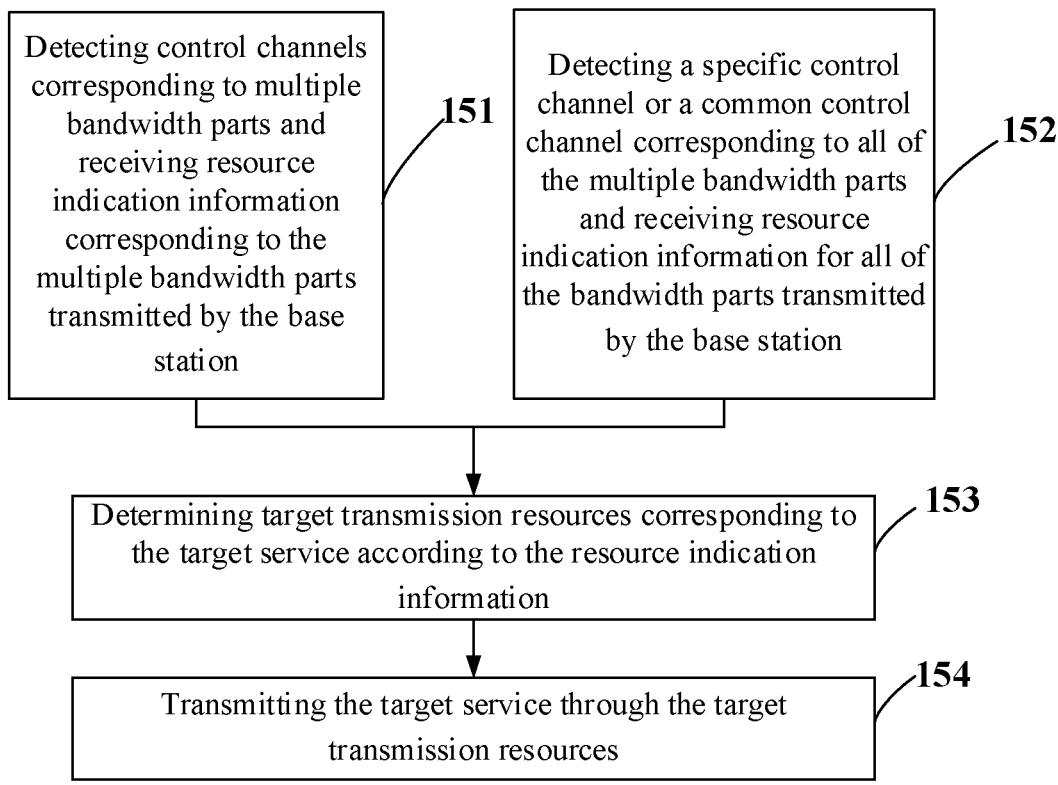
FIG. 15 illustrates a flowchart of a resource allocation indication method in some embodiments of the present disclosure.

As shown in FIG. 15, the resource allocation indication method of the embodiments of the present disclosure specifically includes the following steps 151, 153, and 154, or steps 152, 153 and 154.

Step 151: detecting control channels corresponding to each of multiple bandwidth parts and receiving resource indication information corresponding to the multiple bandwidth parts transmitted by the base station.

If the terminal supports two or more bandwidth parts simultaneously, and if each of the bandwidth parts has a control channel corresponding to the bandwidth part, then as shown in FIG. 6, detection may be performed in the control channel corresponding to the bandwidth part, thereby acquiring the resource indication information transmitted by the base station. The indication method may be the indication method in any one of the above-described first mode or the second mode.

Optionally, step 152: detecting a specific control channel or a common control channel corresponding to all of the multiple bandwidth parts and receiving resource indication information for all of the bandwidth parts transmitted by the base station.

In a case that the terminal supports two or more bandwidth parts simultaneously, the base station may also indicate all of the bandwidth parts simultaneously by using one control channel, then the terminal may detect a specific control channel or a common control channel corresponding to all of the bandwidth parts, and receive the resource indication information of all of the bandwidth parts transmitted by the base station. As shown in FIG. 7, the specific control channel may be a control channel on any one of the multiple bandwidth parts, or may be a common control channel commonly used by the multiple bandwidth parts, as shown in FIG. 8.

Step 153: determining target transmission resources corresponding to the target service according to the resource indication information.

Step 154: transmitting the corresponding target service through the target transmission resources.

Specific implementations of different indication modes are respectively described above in scenarios in which the terminal supports one bandwidth part and multiple bandwidth parts. Specific forms of the resource indication information will be further described below in conjunction with specific examples.

Specifically, the first indication information includes a first bit group. A plurality of bits in the first bit group correspond to different bandwidth parts, respectively. The number of bits in the first bit group is the number of the bandwidth parts supported by the base station.

Optionally, the first indication information includes at least one second bit group. The number of the at least one second bit group is the maximum number of the bandwidth parts supported by the terminal, and different values of the at least one second bit group correspond to different bandwidth parts. This indication mode is a bitmap indication mode, i.e., different bandwidth parts are mapped onto a bitmap, and this mapping relationship may be defined by a standard protocol, or configured according to a bandwidth allocation result.

Further, the first indication information further includes at least one of resource location information, bandwidth information, numerology information (Numerology), and cyclic prefix (CP) information of the bandwidth parts corresponding to the target transmission resources. It should be noted that the first indication information may be directly transmitted to the terminal through a broadcast channel or a RRC signaling or a group common PDCCH or DCI. In a case that the first indication information is transmitted through the DCI, the first indication information may be transmitted in a previous slot or in a current slot.

In the resource allocation indication method according to the embodiments of the present disclosure, the terminal receives the resource indication information (the first indication information and the second indication information) transmitted by the base station in two steps, and is informed of, based on the resource indication information, the target transmission resources allocated by the base station to the terminal, so that service data is transmitted in the frequency-domain resources corresponding to the target transmission resources, and the allocation flexibility of the frequency-domain resources and the frequency utilization rate of the system are improved.

The above embodiments describe the resource allocation indication method in different scenarios, and the terminal corresponding to the resource allocation indication method will be further described with reference to the accompanying drawings.

Figure 16:
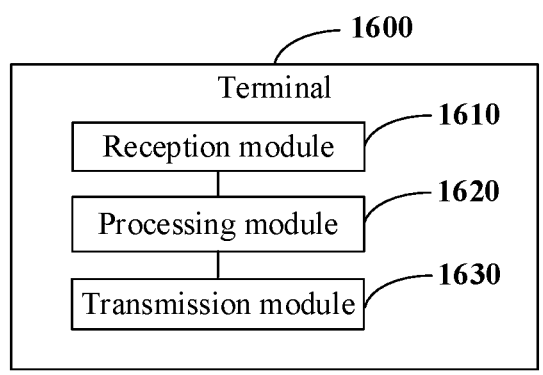
FIG. 16 shows a schematic structural diagram of a terminal in some embodiments of the present disclosure.

As shown in FIG. 16, a terminal 1600 according to the embodiments of the present disclosure may implement details of the resource allocation indication method in some embodiments including receiving resource indication information transmitted by a base station, determining target transmission resources corresponding to the target service according to the resource indication information; and transmitting the target service through target transmission resources, and achieve the same effect as that of the method, wherein the resource indication information includes first indication information and second indication information, the first indication information is used to indicate one or more bandwidth parts of the target transmission resources and the one or more bandwidth parts are a portion or all of the total bandwidth; the second indication information is used to indicate location information of PRBs allocated to the terminal in PRBs corresponding to the one or more bandwidth parts. Specifically, the terminal 1600 includes a reception module 1610, a processing module 1620, and a transmission module 1630. The reception module 1610 is configured to receive the resource indication information transmitted by the base station, wherein the resource indication information includes first indication information and second indication information. The processing module 1620 is configured to determine target transmission resources corresponding to the target service according to the resource indication information, wherein the first indication information is used to indicate one or more bandwidth parts of the target transmission resources, the one or more bandwidth parts are a portion or all of the total bandwidth, and the second indication information is used to indicate location information of PRBs allocated to the terminal in PRBs corresponding to the one or more bandwidth parts. The transmission module 1630 is configured to transmit a target service through the target transmission resources.

Figure 17:
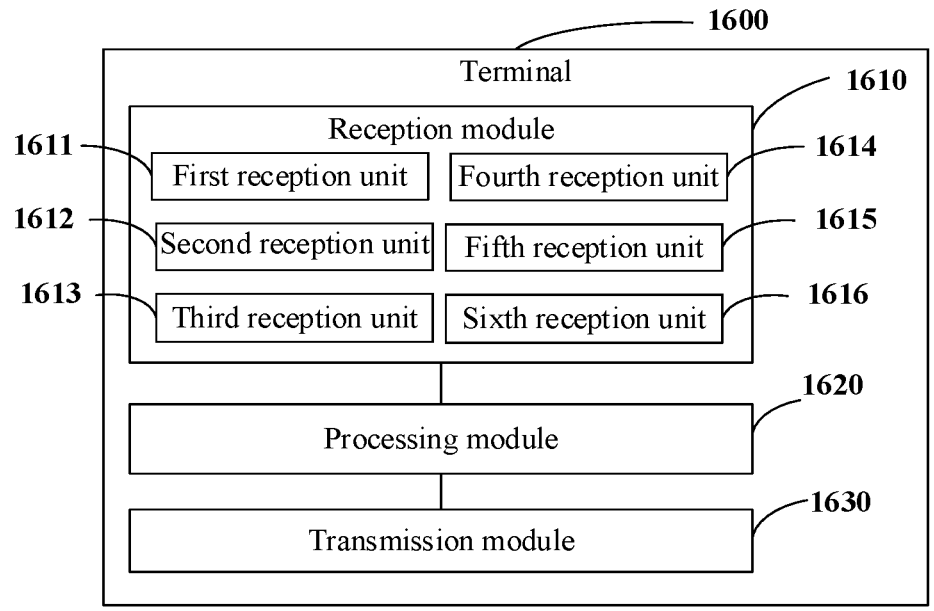
FIG. 17 shows a schematic structural diagram of a terminal in some embodiments of the present disclosure.

As shown in FIG. 17, the reception module 1610 includes a first reception unit 1611 and a second reception unit 1612. The first reception unit 1611 is configured to detect a broadcast channel, Radio Resource Control (RRC) information or a periodic group common Physical Downlink Control Channel (group common PDCCH) to obtain first indication information of the resource indication information transmitted by the base station. The second reception unit 1612 is configured to detect DCI and acquire second indication information of the resource indication information transmitted by the base station, wherein the DCI includes one-stage DCI or any DCI of a two-stage DCI.

The reception module 1610 includes a third reception unit 1613 and a fourth reception unit 1614. The third reception unit 1613 is configured to detect a group common PDCCH or first DCI and receive first indication information of the resource indication information transmitted by the base station, wherein, the first DCI includes one-stage DCI or any DCI of a two-stage DCI. The fourth reception unit 1614 is configured to detect second DCI and receive second indication information of the resource indication information transmitted by the base station, wherein the second DCI includes one-stage DCI or any DCI of a two-stage DCI.

If the first DCI is the one-stage DCI, then the second DCI and the first DCI are transmitted through same DCI; or, if the first DCI is a first stage DCI of the two-stage DCI, then the second DCI is any DCI of the two-stage DCI; or, if the first DCI is a second stage DCI of the two-stage DCI, then the second DCI is the second stage DCI of the two-stage DCI.

The reception module 1610 includes a fifth reception unit 1615 or a sixth reception unit 1616. The fifth reception unit 1615 is configured to detect control channels corresponding to multiple bandwidth parts and receive resource indication information corresponding to the multiple bandwidth parts transmitted by the base station. The sixth reception unit 1616 is configured to detect a specific control channel or a common control channel corresponding to all of the multiple bandwidth parts and receive resource indication information for all of the bandwidth parts transmitted by the base station.

The first indication information includes a first bit group. A plurality of bits in the first bit group correspond to different bandwidth parts, respectively.

Optionally, the first indication information includes at least one second bit group. The number of the at least one second bit group is the maximum number of the bandwidth parts supported by the terminal, and different values of the at least one second bit group correspond to different bandwidth parts.

The first indication information includes at least one of resource location information, bandwidth information, numerology information (Numerology), and cyclic prefix (CP) information of the bandwidth parts corresponding to the target transmission resources.

It should be noted that the terminal of the embodiments of the present disclosure receives the resource indication information transmitted by the base station, and is informed of, based on the resource indication information, the target transmission resources allocated by the base station to the terminal, so that service data is transmitted in the frequency-domain resources corresponding to the target transmission resources, and the allocation flexibility of the frequency-domain resources and the frequency utilization rate of the system are improved.

Figure 18:
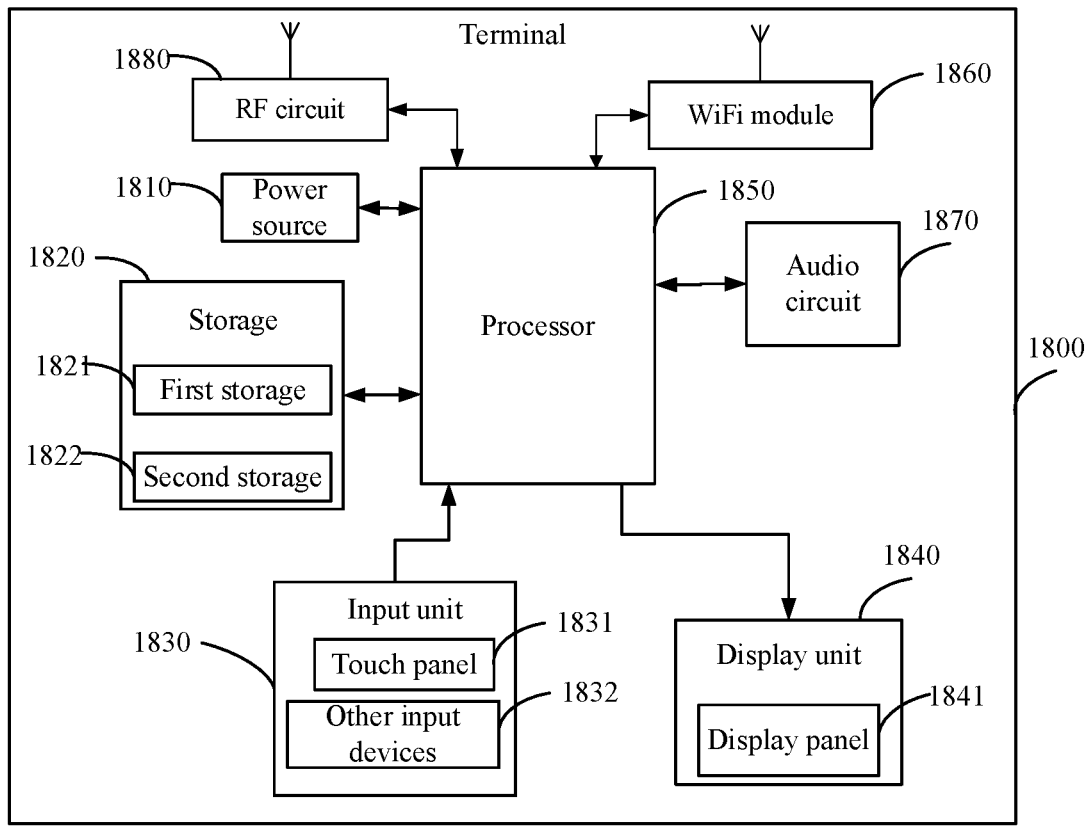
FIG. 18 illustrates a block diagram of a terminal in some embodiments of the present disclosure.

FIG. 18 is a schematic structural diagram of a terminal according to some other embodiments of the present disclosure. Specifically, the terminal 1800 in FIG. 18 may be a mobile phone, a tablet computer, a Personal Digital Assistant (PDA), an on-board computer, or the like.

The terminal 1800 in FIG. 18 includes a power source 1810, a storage 1820, an input unit 1830, a display unit 1840, a processor 1850, a WIFI (Wireless Fidelity) module 1860, an audio circuit 1870, and a RF (Radio Frequency) circuit 1880.

Here, the input unit 1830 may be configured to receive information inputted by a user and generate a signal input related to user setting and function control of the terminal 1800. Specifically, in the embodiments of the present disclosure, the input unit 1830 may include a touch panel 1831. The touch panel 1831, also referred to as a touch screen, may collect user touch operations of the user on or near the touch panel (such as user operations of a user on the touch panel 1831 using any suitable object or accessory such as a finger, a stylus, etc.), and drive a corresponding connected device according to preset programs. In some optional embodiments, the touch panel 1831 may include a touch detection device and a touch controller. The touch detection device detects a touch orientation of the user, detects a signal brought about by the touch operation, and transmits the signal to the touch controller. The touch controller receives touch information from the touch detection device, converts the touch information into coordinates of contact points, transmits the coordinates of contact points to the processor 1850, and may receive and execute commands from the processor 1850. In addition, the touch panel 1831 may be implemented in a plurality of types, such as a resistive type, a capacitive type, an infrared-ray type, and a surface acoustic wave type. Besides the touch panel 1831, the input unit 1830 may further include other input devices 1832 which may include, but are not limited to, one or more of a physical keyboard, function keys (such as volume control keys, switch keys, etc.), a trackball, a mouse, a joystick, etc.

The display unit 1840 may be used to display information inputted by the user or information provided to the user and various menu interfaces of the terminal. The display unit 1840 may include a display panel 1841, and in some optionally embodiments, a LCD or an Organic Light-Emitting Diode (OLED) may be employed to configure the display panel 1841.

It should be noted that the touch panel 1831 may cover the display panel 1841 to form a touch display screen. In a case that the touch display screen detects the touch operations on or near the touch display screen, the touch operations are transmitted to the processor 1850 to determine a type of a touch event. The processor 1850 provides a corresponding visual output on the touch display screen according to the type of the touch event.

The touch display screen includes an application interface display area and a common control display area. An arrangement of the application interface display area and the common control display area is not limited, and the arrangement of the two display areas may be a top-bottom arrangement, a left-right arrangement, and the like. The application interface display area may be used to display interfaces of applications. Each of the interfaces may contain interface elements such as icons and/or widget desktop controls for one or more applications. The application interface display area may also be an empty interface that does not contain any content. The common control display area is used to display controls used at a high usage rate, such as setting buttons, interface numbers, scroll bars, phonebook icons, and other application icons.

The processor 1850 is a control center of the terminal and connects various parts of the entire handset by using various interfaces and lines. By running or executing software programs and/or modules stored in the first storage 1821, and invoking data stored in the second storage 1822, the processor 1850 executes various functions of the terminal and processes data to monitor an entirety of the terminal. In some optional embodiments, the processor 1850 may include one or more processing units.

In the embodiments of that present disclosure, the processor 1850 is configured to preform steps by invoking software programs and/or modules stored in the first storage 1821 and/or data stored in the second storage 1822: receiving resource indication information transmitted by a base station, wherein the resource indication information includes first indication information and second indication information; determining target transmission resources corresponding to a target service according to the resource indication information, wherein the first indication information is used to indicate one or more bandwidth parts of the target transmission resources, the one or more bandwidth parts are a portion or all of the total bandwidth, the second indication information is used to indicate location information of PRBs allocated to the terminal in the PRBs corresponding to the one or more bandwidth parts; transmitting the target service through the target transmission resources.

Specifically, the processor 1850 is further configured to detect a broadcast channel, Radio Resource Control (RRC) information, or a periodic group common Physical Downlink Control Channel (group common PDCCH), and acquire first indication information of the resource indication information transmitted by the base station; detect DCI and acquire second indication information of the resource indication information transmitted by the base station, wherein the DCI includes one-stage DCI or any DCI of a two-stage DCI.

Specifically, the processor 1850 is further configured to detect the group common PDCCH or the first DCI, and receive the first indication information of the resource indication information transmitted by the base station, wherein, the first DCI includes one-stage DCI or any DCI of a two-stage DCI; detect second DCI and receive second indication information of the resource indication information transmitted by the base station, wherein the second DCI includes one-stage DCI or any DCI of a two-stage DCI.

If the first DCI is the one-stage DCI, then the second DCI and the first DCI are transmitted through same DCI; or, if the first DCI is a first stage DCI of the two-stage DCI, then the second DCI is any DCI of the two-stage DCI; or, if the first DCI is a second stage DCI of the two-stage DCI, then the second DCI is the second stage DCI of the two-stage DCI.

Specifically, the processor 1850 is further configured to detect control channels corresponding to multiple bandwidth parts and receive resource indication information corresponding to the multiple bandwidth parts transmitted by the base station; or detect a specific control channel or a common control channel corresponding to all of the multiple bandwidth parts and receive resource indication information for all of the bandwidth parts transmitted by the base station.

The first indication information includes a first bit group. A plurality of bits in the first bit group correspond to different bandwidth parts, respectively.

The first indication information includes at least one second bit group. The number of the at least one second bit group is the maximum number of the bandwidth parts supported by the terminal, and different values of the at least one second bit group correspond to different bandwidth parts.

The first indication information further includes at least one of resource location information, bandwidth information, numerology information (Numerology), and cyclic prefix (CP) information of the bandwidth parts corresponding to the target transmission resources.

The terminal according to the embodiments of the present disclosure receives the resource indication information transmitted by the base station, and is informed of, based on the resource indication information, the target transmission resources allocated by the base station to the terminal, so that service data is transmitted in the frequency-domain resources corresponding to the target transmission resources, and the allocation flexibility of the frequency-domain resources and the frequency utilization rate of the system are improved.

Those of ordinary skill in the art will appreciate that elements and algorithm steps of examples described in connection with the embodiments disclosed herein may be implemented in electronic hardware, or a combination of computer software and electronic hardware. Whether functions are executed in hardware or are executed in software depends on specific applications and design constraints of the technical solution. One skilled in the art may use different methods to implement the described functions for each particular application, but such implementation should not be considered to go beyond the scope of the present disclosure.

Those skilled in the art may clearly understand that, for convenience and brevity of description, specific working processes of the above-described systems, devices and units may be obtained by referring to corresponding processes in the foregoing process embodiments, and will not be described in detail herein.

In the embodiments provided herein, it should be understood that the disclosed apparatus and methods may be implemented in other ways. For example, the product embodiments described above are merely illustrative, for example, a division to modules is only a logical functional division, and additional divisions may exist in actual conditions. For example, multiple elements or components may be combined or may be integrated into another system, or some features may be ignored or not performed. Optionally, a coupling or a direct coupling or a communication connection between modules or elements being shown or discussed may be an indirect coupling or a communication connection through some interfaces, devices or units, and the coupling or a direct coupling or a communication connection may be in an electrical, a mechanical or other form.

The elements described as separate elements may or may not be physically separate, and elements displayed as units may or may not be physical elements, i.e. may be located in one place or may be distributed over a plurality of network elements. Some or all of the units therein may be selected according to actual needs to achieve the purpose of the solution of the present disclosure.

In addition, functional units in the embodiments of that present disclosure may be integrated in one processing unit, may be physically exist separately from each other, or two or more of the functional units may be integrated in one unit.

The functions, if implemented in a form of software functional units and sold or used as separate products, may be stored in a computer readable storage medium. Based on this understanding, an essence of the technical solution of the present disclosure, or a part of the technical solution of the present disclosure contributing to the related art, or a part of the technical solution may be embodied in a form of a software product stored in a storage medium. The storage medium includes a number of instructions used to cause a computer device (which may be a personal computer, a server, or a network device, etc.) to perform all or parts of the steps of the method described in various embodiments of the present disclosure. The aforementioned storage medium includes various medium capable of storing program codes, such as a USB disk, a removable hard disk, a ROM, a RAM, a magnetic disk, or a compact disc.

Furthermore, it should be noted that in the apparatus and method of the present disclosure, components or steps may be apparently decomposed and/or recombined. Solutions obtained through these decomposition and/or recombination shall be regarded as equivalent solutions of the present disclosure. Also, steps of performing a series of processes described above may naturally be performed in a chronological order or in a described order, but need not necessarily be performed in the chronological order, and some steps may be performed in parallel or independently of each other. It will be understood by those of ordinary skills in the art that all or any of steps or components of the method and apparatus of the present disclosure may be implemented in hardware in any computing device (including a processor, a storage medium, etc.) or in a network of computing devices, and implemented by hardware, firmware, software, or a combination thereof. The implementations may be achieved by one of ordinary skills in the art using their basic programming skills upon reading the description of the present disclosure.

Accordingly, objectives of the present disclosure may also be achieved by running a program or a set of programs on any computing device. The computing device may be a commonly known device. Accordingly, the objectives of the present disclosure may also be achieved by merely providing program products containing program codes used for implementing the method or the apparatus. That is, such program products also constitute a part of the present disclosure, and a storage medium storing such program products also constitute a part of the present disclosure. Obviously, the storage medium may be any known storage medium or any storage medium developed in the future. It should be further noted that in the apparatus and method of the present disclosure, components or steps may be apparently decomposed and/or recombined. Solutions obtained through these decomposition and/or recombination shall be regarded as equivalent solutions of the present disclosure. Also, steps of performing a series of processes described above may naturally be performed in a chronological order or in a described order, but need not necessarily be performed in the chronological order, and some steps may be performed in parallel or independently of each other.

What is described above are optional embodiments of the present disclosure, it should be noted that for those of ordinary skills in the art, several modifications and embellishments may be made by one of ordinary skills in the art without departing from the principles of the present disclosure. These modifications and embellishments are also within the scope of the present disclosure.

What is claimed is:

1. A resource allocation indication method applied to a base station side, comprising:
    allocating corresponding target transmission resources to a terminal in a case that a target service occurs, wherein the target transmission resources comprise uplink transmission resources or downlink transmission resources;
    transmitting resource indication information to the terminal according to the target transmission resources,
    wherein the resource indication information comprises first indication information and second indication information, the first indication information is used to indicate one or more bandwidth parts of the target transmission resources, the one or more bandwidth parts are a portion or all of a total bandwidth, the second indication information is used to indicate location information of Physical Resource Blocks (PRBs) allocated to the terminal in PRBs corresponding to the one or more bandwidth parts;
    wherein the first indication information comprises at least one second bit group, the number of the at least one second bit group is the maximum number of bandwidth parts supported by the terminal, and different values of the at least one second bit group correspond to different bandwidth parts.

2. The resource allocation indication method according to claim 1, wherein transmitting the resource indication information to the terminal according to the target transmission resources, comprises:
    transmitting the first indication information of the resource indication information for the target transmission resources to the terminal through a broadcast channel, or Radio resource control (RRC) information;
    transmitting the second indication information of the resource indication information for the target transmission resources to the terminal through Downlink Control Information (DCI), wherein the DCI comprises one-stage DCI or any DCI of a two-stage DCI.

3. The resource allocation indication method according to claim 1, wherein if the target transmission resources correspond to multiple bandwidth parts, transmitting the resource indication information to the terminal according to the target transmission resources, comprises:
    transmitting resource indication information for the target transmission resources to the terminal through control channels corresponding to the multiple bandwidth parts corresponding to the target transmission resources; or
    transmitting the resource indication information for the target transmission resources to the terminal through any control channel corresponding to the multiple bandwidth parts corresponding to the target transmission resources or through a common control channel corresponding to all of the multiple bandwidth parts.

4. The resource allocation indication method according to claim 2, wherein if the target transmission resources correspond to multiple bandwidth parts, transmitting the resource indication information to the terminal according to the target transmission resources, comprises:
    transmitting resource indication information for the target transmission resources to the terminal through control channels corresponding to the multiple bandwidth parts corresponding to the target transmission resources; or
    transmitting the resource indication information for the target transmission resources to the terminal through any control channel corresponding to the multiple bandwidth parts corresponding to the target transmission resources or through a common control channel corresponding to all of the multiple bandwidth parts.

5. The resource allocation indication method according to claim 1, wherein the first indication information comprises at least one of: resource location information, bandwidth information, numerology information, or cyclic prefix (CP) information of one or more bandwidth parts corresponding to the target transmission resources.

6. A resource allocation indication method applied to a terminal side, comprising:
    receiving resource indication information transmitted by a base station; wherein the resource indication information comprises first indication information and second indication information;
    determining target transmission resources corresponding to a target service according to the resource indication information; wherein the first indication information is used to indicate one or more bandwidth parts of the target transmission resources, the one or more bandwidth parts are a portion or all of a total bandwidth, the second indication information is used to indicate location information of Physical Resource Blocks (PRBs) allocated to the terminal in PRBs corresponding to the one or more bandwidth parts;

transmitting the target service through the target transmission resources;

wherein the first indication information comprises at least one second bit group, the number of the at least one second bit group is the maximum number of bandwidth parts supported by the terminal, and different values of the at least one second bit group correspond to different bandwidth parts.

7. The resource allocation indication method according to claim 6, wherein receiving the resource indication information transmitted by the base station, comprises:

detecting a broadcast channel, or Radio Resource Control (RRC) information, and acquiring the first indication information of the resource indication information transmitted by the base station;

detecting Downlink Control Information (DCI), and acquiring the second indication information of the resource indication information transmitted by the base station, wherein the DCI comprises one-stage DCI or any DCI of a two-stage DCI.

8. The resource allocation indication method according to claim 6, wherein receiving the resource indication information transmitted by the base station, comprises:

detecting control channels corresponding to each of multiple bandwidth parts and receiving the resource indication information corresponding to the multiple bandwidth parts transmitted by the base station; or, detecting a specific control channel or a common control channel corresponding to all of the multiple bandwidth parts and receiving the resource indication information for all of the multiple bandwidth parts transmitted by the base station.

9. The resource allocation indication method according to claim 7, wherein receiving the resource indication information transmitted by the base station, comprises:

detecting control channels corresponding to each of multiple bandwidth parts and receiving the resource indication information corresponding to the multiple bandwidth parts transmitted by the base station; or, detecting a specific control channel or a common control channel corresponding to all of the multiple bandwidth parts and receiving the resource indication information for all of the multiple bandwidth parts transmitted by the base station.

10. The resource allocation indication method according to claim 6, wherein the first indication information comprises at least one of: resource location information, bandwidth information, numerology information, or cyclic prefix (CP) information of one or more bandwidth parts corresponding to the target transmission resources.

11. A terminal, comprising:

a reception circuit, configured to receive resource indication information transmitted by a base station; wherein the resource indication information comprises first indication information and second indication information;

a processing circuit, configured to determine target transmission resources corresponding to a target service according to the resource indication information; wherein the first indication information is used to indicate one or more bandwidth parts of the target transmission resources, the one or more bandwidth parts are a portion or all of a total bandwidth, the second indication information is used to indicate location information of Physical Resource Blocks (PRBs) allocated to a terminal in PRBs corresponding to the one or more bandwidth parts;

a transmission circuit, configured to transmit the target service through the target transmission resources;

wherein the first indication information comprises at least one second bit group, the number of the at least one second bit group is the maximum number of bandwidth parts supported by the terminal, and different values of the at least one second bit group correspond to different bandwidth parts.

12. The terminal according to claim 11, wherein the reception circuit comprises at least one of a first reception subcircuit, a second reception subcircuit, the first reception subcircuit is configured to detect a broadcast channel, or Radio Resource Control, and acquire the first indication information of the resource indication information transmitted by the base station, the second reception subcircuit is configured to detect Downlink Control Information (DCI), and acquire the second indication information of the resource indication information transmitted by the base station, wherein the DCI comprises one-stage DCI or any DCI of a two-stage DCI.

13. The terminal according to claim 12, wherein the reception circuit further comprises at least one of a third reception subcircuit or a fourth reception subcircuit, the third reception subcircuit is configured to detect a periodic group common Physical Downlink Control Channel (group common PDCCH) or first Downlink Control Information (DCI) and receive the first indication information of the resource indication information transmitted by the base station; wherein the first DCI comprises one-stage DCI or any DCI of a two-stage DCI, the fourth reception subcircuit is configured to detect second DCI and receive the second indication information of the resource indication information transmitted by the base station, wherein the second DCI comprises one-stage DCI or any DCI of a two-stage DCI, wherein:

if the first DCI is the one-stage DCI, then the second DCI and the first DCI are transmitted through a same DCI; or, if the first DCI is the first stage DCI of a two-stage DCI, then the second DCI is any DCI of the two-stage DCI; or, if the first DCI is the second stage DCI of the two-stage DCI, then the second DCI is the second stage DCI of the two-stage DCI.

14. The terminal according to claim 11, wherein the reception circuit comprises:

a fifth reception subcircuit, configured to detect control channels corresponding to multiple bandwidth parts and receive the resource indication information corresponding to the multiple bandwidth parts transmitted by the base station; or, a sixth reception subcircuit, configured to detect a specific control channel or a common control channel corresponding to all of the multiple bandwidth parts and receive the resource indication information for all of the multiple bandwidth parts transmitted by the base station.

15. The terminal according to claim 12, wherein the reception circuit comprises:

a fifth reception subcircuit, configured to detect control channels corresponding to multiple bandwidth parts and receive the resource indication information corresponding to the multiple bandwidth parts transmitted by the base station; or, a sixth reception subcircuit, configured to detect a specific control channel or a common control channel corresponding to all of the multiple bandwidth parts and receive the resource indication information for all of the multiple bandwidth parts transmitted by the base station.

16. The terminal according to claim 11, wherein the first indication information comprises at least one of: resource location information, bandwidth information, numerology information, or cyclic prefix (CP) information of one or more bandwidth parts corresponding to the target transmission resources.

17. A base station, comprising:
a storage, a processor and a computer program stored on the storage and executable on the processor, wherein when the processor executes the computer program, the processor implements steps of the resource allocation indication method according to claim 1.

18. A terminal, comprising:
a storage, a processor and a computer program stored on the storage and executable on the processor, wherein when the processor executes the computer program, the processor implements steps of the resource allocation indication method according to claim 6.

19. A non-transitory computer-readable storage medium, comprising:
a computer program stored on the non-transitory computer-readable storage medium, wherein when a processor executes the computer program, the processor implements steps of the resource allocation indication method according to claim 1.

20. A non-transitory computer-readable storage medium, comprising:
a computer program stored on the non-transitory computer-readable storage medium, wherein when a processor executes the computer program, the processor implements steps of the resource allocation indication method according to claim 6.

* * * * *